United States Patent Office 3,108,826
Patented Oct. 29, 1963

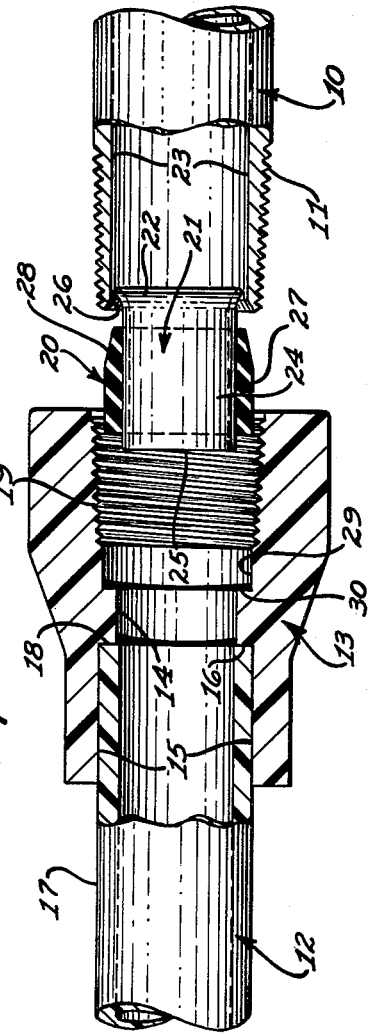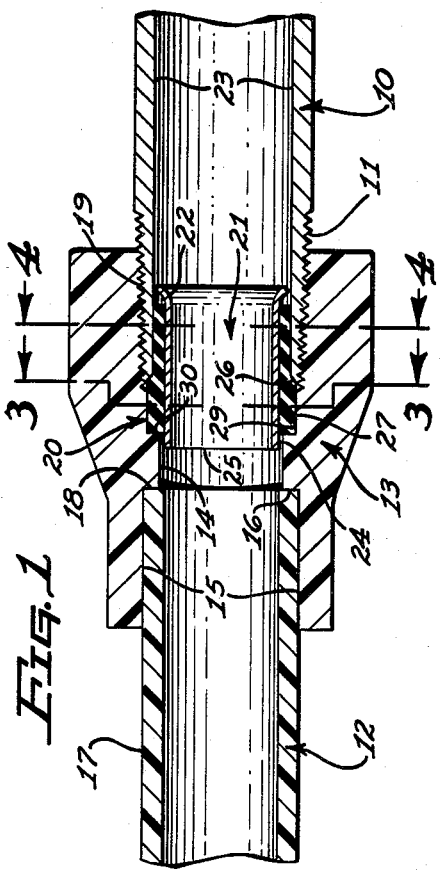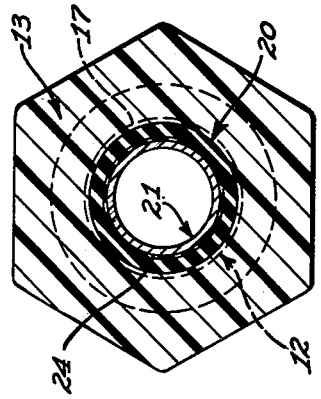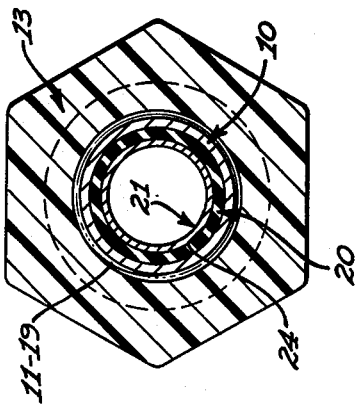

3,108,826
TRANSITION PIPE COUPLING
Douglas E. Black, 2044 W. Palo Verde, Phoenix, Ariz.
Filed Mar. 19, 1962, Ser. No. 180,789
3 Claims. (Cl. 285—174)

This invention pertains to pipe and tubing couplings and is particularly directed to a transition coupling for interconnecting plastic and metallic pipes and tubes.

Due to the varying and dissimilar expansion factors involved at different operating temperatures difficulty is encountered with ordinary heretofore used procedures practiced in connecting plastic pipe to metallic pipe lines. In instances where a plastic coupling is screwed on to a threaded metal pipe the expansion and contraction causes the joint to become loosened resulting in leakage whereas with the particular transition coupling of this invention no such leaks develop.

One of the objects of this invention is to provide a transition coupling between plastic and metallic pipe which is reliable and free of leakage during long and extended periods of service.

Another object of this invention is to construct a pipe coupling for connecting plastic and metallic pipe which is simple to make and easy to install.

A further object is to provide a transition coupling between plastic and metallic pipe which is not critical in design and operation and seals tight even though the threaded interconnect may bottom out.

A still further feature of this invention is to utilize the pressure in the pipe line to permanently keep the joint sealed resulting in long life and dependability for the coupling connection.

It is also an object to provide a transition coupling between plastic and metal pipe in which the temperature changes in the pipe line causing expansion and contraction in varying different amounts between the plastic and metallic pipe portions is taken up by the resilient rubber seal by the plastic flow characteristics of the seal.

It is further an object to construct a transition coupling as recited above in which a differential of pressure each side of the rubber seal causes the seal to at all times remain in tightly packed sealing relationship between the metal and plastic coupling members.

Further features and advantages of this invention will appear from a detailed description of the drawings in which:

FIG. 1 is an enlarged fragmentary section showing the transition coupling incorporating the features of this invention in assembled condition.

FIG. 2 is a view similar to FIG. 1 but showing the transition coupling with the various parts in disassembled condition.

FIG. 3 is an enlarged cross section on the line 3—3 of FIG. 1.

FIG. 4 is an enlarged cross section on the line 4—4 of FIG. 1.

As an example of one embodiment of this invention, there is shown a transition coupling adapted to interconnect a standard metallic pipe 10 having the usual conventional pipe thread 11 to a plastic pipe 12. To this end there is provided a plastic coupling 13 having a bore 14 and a counter bore 15 terminating in a radially disposed abutment surface 16. The plastic pipe 12 may be connected to the plastic coupling 13 by applying the usual plastic cement to the diameter portion 17 and end surface 18 of the plastic pipe and inserting it into the counterbore 15 up against the abutment surface 16.

The other end of the plastic coupling 13 has the usual mating pipe thread 19 formed therein to thread up on the thread 11 on the metallic pipe 10. A seal 20 of suitable yieldable rubber or plastic material is slipped on to a seal sleeve 21 which has a flared end 22 having an outer diameter just slightly less than the inside diameter of the bore 23 of the pipe 10. The diameter portion 24 of the seal sleeve 21 upon which is mounted the seal 20 is just slightly smaller than the bore 14 of the plastic coupling.

The seal 20, when mounted on the sleeve 21, leaves the end 25 of the sleeve projecting so that the diameter portion 24 may initially enter the bore 14 upon assembly of the coupling. Preferably the metallic pipe bore is reamed at 26 for easy entrance of the flared end 22 into the bore 23 of the metallic pipe 10 and to allow the pipe bore 23 to move over the outside diameter portion 27 of the seal 20, which portion may be chamfered at 28 to facilitate movement of the seal 20 into the pipe bore 23. At the bottom of the pipe threads 19 in the plastic coupling 13 is a diameter portion 29 terminating in a radially disposed abutment surface 30.

As the plastic coupling 13 is screwed upon the metallic pipe 10, the bore 23 of the pipe 10 presses over the outside diameter 27 of the seal 20 causing the seal to flow in tightly sealed relationship with the pipe bore 23 and the outside diameter of the sleeve 21. Further, the seal 20 is tightly packed up against the diameter portion 29 and the abutment surface 30 of the plastic coupling 13 forming a tight leak-proof seal there against. It will be noted that entrance of the end 25 of the sleeve 21 in the bore 14 of the plastic coupling 13 and the guiding of the flared end 22 in the bore 23 of the pipe 10 maintains the seal properly concentrically aligned in the pipe bore 23 for even distribution of the seal in the pipe bore 23 and the diameter portion 29 of the plastic coupling.

It is to be further noted that the diameter of the pipe bore 23 is greater than that of the bore 14 in the plastic coupling 13 so that a differential of pressure is developed to normally hold the sleeve 21 and seal 20, to the left in FIG. 1, with end 25 of the sleeve 21 entered into the bore 14 of the plastic coupling and the flared end 22 of the sleeve 21 up against the right hand end of the seal so as to at all times keep the seal properly seated within the coupling.

It will thus be noted that the plastic pipe 12 is mechanically joined and held in alignment with the metallic pipe 10 through the threaded connection 11—19 between the pipe 10 and the plastic coupling 13 but that the actual resilient sealing is accomplished between the bore 23 of the pipe 10, the sleeve 21 and the surfaces 29 and 30 of the plastic coupling 13 which makes allowance for expansion and contraction forces with temperature changes in the pipe line, the threads 11—19 being thus relieved of any sealing function in the transition coupling system described.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A transition coupling for interconnecting plastic and metallic pipe including in combination:
   a. a plastic coupling having a counterbore in one end to receive and secure a plastic pipe and a bore having a pipe thread in the other end of said plastic coupling adapted to be screwed on the regular pipe thread of the metallic pipe to be interconnected with said plastic pipe, b. a diameter portion and a radially disposed abutment surface in the bottom of said threaded bore of said plastic coupling,
c. a bore formed in said plastic coupling intermediate the ends thereof,
d. a seal sleeve having a straight end portion adapted to enter and be supported in said intermediate bore of said plastic coupling and having a flared other end adapted to be received in and supported in the bore of said metallic pipe,
e. and a cylindrical seal mounted on said seal sleeve intermediate the ends thereof adapted to be squeezed in sealing relationship between the inside bore of said metallic pipe and said diameter portion and radially disposed abutment surface of said plastic coupling and the outside diameter portion of said seal sleeve when said plastic coupling is screwed to assembled position on the threads of said metallic pipe.

2. A transition coupling for interconnecting plastic and metallic pipe including in combination:
a. a plastic coupling having a counterbore in one end to receive and secure a plastic pipe and a bore having a pipe thread in the other end of said plastic coupling adapted to be screwed on the regular pipe thread of the metallic pipe to be interconnected with said plastic pipe,
b. a diameter portion and a radially disposed abutment surface in the bottom of said threaded bore of said plastic coupling,
c. a bore formed in said plastic coupling intermediate the ends thereof,
d. a seal sleeve having a straight end portion adapted to enter and be supported in said intermediate bore of said plastic coupling and having a flared other end adapted to be received in and supported in the bore of said metallic pipe,
e. and a cylindrical seal mounted on said seal sleeve intermediate the ends thereof adapted to be squeezed in sealing relationship between the inside bore of said metallic pipe and said diameter portion and radially disposed abutment surface of said plastic coupling and the outside diameter portion of said seal sleeve when said plastic coupling is screwed to assembled position on the threads of said metallic pipe whereby said seal sleeve is supported in coaxial alignment with the axis of said plastic and metal pipes to provide an even concentric distribution of said seal within said metal pipe and said plastic coupling.

3. A transition coupling for interconnecting plastic and metallic pipe including in combination:
a. a plastic coupling having a counterbore in one end to receive and secure a plastic pipe and a bore having a pipe thread in the other end of said plastic coupling adapted to be screwed on the regular pipe thread of the metallic pipe to be interconnected with said plastic pipe,
b. a diameter portion and a radially disposed abutment surface in the bottom of said threaded bore of said plastic coupling,
c. a bore formed in said plastic coupling intermediate the ends thereof,
d. a seal sleeve having a straight end portion adapted to enter and be supported in said intermediate bore of said plastic coupling and having a flared other end adapted to be received in and supported in the bore of said metallic pipe,
e. and a cylindrical seal mounted on said seal sleeve intermediate the ends thereof adapted to be squeezed in sealing relationship between the inside bore of said metallic pipe and said diameter portion and radially disposed abutment surface of said plastic coupling and the outside diameter portion of said seal sleeve when said plastic coupling is screwed to assembled position on the threads of said metallic pipe when said intermediate bore in said plastic coupling is of smaller diameter than the bore of said metallic pipe so that a differential of pressure exists within said transition coupling to normally hold said seal and seal sleeve within said metallic pipe bore and intermediate plastic coupling bore in a direction against said radially disposed abutment surface of said plastic coupling.

References Cited in the file of this patent
UNITED STATES PATENTS

| | | |
|---|---|---|
| 630,047 | Gilbert | Aug. 1, 1899 |
| 1,938,255 | Hinderliter | Dec. 5, 1933 |
| 2,776,151 | Harkenrider | Jan. 1, 1957 |
| 2,804,320 | Pearson | Aug. 27, 1957 |